United States Patent
Kortum et al.

(10) Patent No.: US 9,456,618 B2
(45) Date of Patent: Oct. 4, 2016

(54) MULTIPLE TEXTURE FOOD

(71) Applicant: Kraft Foods R & D, Inc., Deerfield, IL (US)

(72) Inventors: Olaf C. Kortum, Neubiberg (DE); Richard Ramstoetter, Siegsdorf (DE); Patricia Kemalasari Sudyatma, Munich (DE); Jelena Hoffmann, Munich (DE)

(73) Assignee: Kraft Foods R&D, Inc., Deerfield, IL (US)

( * ) Notice: Subject to any disclaimer, the term of this patent is extended or adjusted under 35 U.S.C. 154(b) by 0 days.

(21) Appl. No.: 14/597,066

(22) Filed: Jan. 14, 2015

(65) Prior Publication Data

US 2015/0132454 A1    May 14, 2015

Related U.S. Application Data

(62) Division of application No. 12/757,439, filed on Apr. 9, 2010, now abandoned.

(30) Foreign Application Priority Data

Apr. 9, 2009 (EP) .................................. 09157710

(51) Int. Cl.
*A23C 19/09* (2006.01)
*A23C 19/076* (2006.01)
*A23C 19/082* (2006.01)
(Continued)

(52) U.S. Cl.
CPC ....... *A23C 19/0765* (2013.01); *A21D 13/0045* (2013.01); *A23C 19/082* (2013.01); *A23C 19/084* (2013.01); *A23C 19/0908* (2013.01); *A23P 30/10* (2016.08); *A23P 30/20* (2016.08); *A23P 30/40* (2016.08); *A23C 2210/30* (2013.01)

(58) Field of Classification Search
None
See application file for complete search history.

(56) References Cited

U.S. PATENT DOCUMENTS 4,721,622 A * 1/1988 Kingham et al. ............... 426/94
5,800,855 A * 9/1998 Rosen ........................... 426/565
(Continued)

FOREIGN PATENT DOCUMENTS

EP    714608 A1 * 6/1996

OTHER PUBLICATIONS

Arbuckle Ice Cream, 2nd Edition, p. 312, AVI Publishing Company 1972.*

(Continued)

*Primary Examiner* — Kelly Bekker
(74) *Attorney, Agent, or Firm* — Fitch, Even, Tabin & Flannery LLP

(57) ABSTRACT

The disclosure herein provides a process for the manufacture of a multiple texture food product. The process includes providing a dairy material, freezing the dairy material by cooling it to a temperature of −2° C. or less, aerating the frozen dairy material, shaping the aerated, frozen dairy material, and depositing the shaped, aerated, frozen dairy material on or between one or more layers of a food material which is not the aerated dairy material. The aerated dairy material has a Stevens firmness of 20 or more at a temperature in the range of from 5 to 10° C. and a water activity ($a_w$) of 0.90 or more. The disclosure herein further provides an aerated dairy material as well as a multiple texture food product which comprises a core of the aerated dairy material and a shell of a food material which is not the aerated dairy material.

11 Claims, 3 Drawing Sheets

(51) Int. Cl.
*A23C 19/084* (2006.01)
*A21D 13/00* (2006.01)

(56) References Cited

U.S. PATENT DOCUMENTS

| | | | | |
|---|---|---|---|---|
| 6,660,317 | B1* | 12/2003 | Akutagawa | A23G 1/205 425/130 |
| 6,821,544 | B1* | 11/2004 | Illy | A01J 27/02 426/134 |
| 2002/0122864 | A1* | 9/2002 | Baensch | A21D 13/0041 426/580 |
| 2009/0041920 | A1* | 2/2009 | Eibel et al. | 426/582 |

OTHER PUBLICATIONS

Sargento Food Service Division p. 1, printed Feb. 2016, http://www.sargentofoodservice.com/trends-innovation/cheese-melt-meter/.*
Ramos "Cream Cheese Pancake Balls (Aebleskiver)" Always Order Dessert Feb. 9, 2011 pp. 1-6 http://www.alwaysorderdessert.com/2011/02/cream-cheese-aebleskiver.html.*

* cited by examiner

MULTIPLE TEXTURE FOOD

CROSS-REFERENCE TO RELATED APPLICATIONS

This application is a divisional, and claims the benefit of earlier filing date under 35 U.S.C. 120, of nonprovisional application Ser. No. 12/757,439 filed Apr. 9, 2010, which is hereby incorporated by reference in its entirety.

FIELD

The disclosure relates generally to a multiple texture food product and method of making such a food product.

BACKGROUND

For forming and packaging purposes, dairy products such as cream cheese and processed cheese are conventionally hot-filled in a tub or mould and subsequently cooled to the storage temperature (usually in the range of from about 2 to 10° C.). The tub could be a sales packaging and, in such case, the tub will be sealed with an aluminium foil lid, thus producing the final packaged product for the consumer.

In a different field, namely in the manufacture of ice cream, it is conventional to aerate (or whip or introduce air into) the ice cream raw mixture when it is extruded in the frozen state into its final form. Ice cream is, however, a food product having substantially different characteristics from dairy products such as cream cheese and processed cheese. At refrigerated temperatures (about 2 to 10° C.), it melts so that the aerated texture collapses. In other words, in order to maintain dimensional stability, ice cream has to be kept in the frozen state.

U.S. Pat. No. 4,795,650 describes a method of making an extruded frozen cheesecake product by forming a stabilized dispersion of, inter alia, cream cheese which is then cooked, homogenized, aerated and frozen. The frozen mixture is extruded to form a free-standing structure and further frozen to a stable state. The frozen cheesecake product obtained by this process is edible only within a product temperature range of from about −10 to 30° F. (−23 to −1° C.)

U.S. Pat. No. 3,966,970 relates to a method of packaging bite-size pieces of a cheese product which includes heating the ingredients to a molten state with mixing, and then cooling and extruding the product at a refrigerated temperature. Thereafter, the extruded bar is subjected to shock cooling, attaining a temperature of 10 to 30° F. (−12 to −1° C.). The bar is finally cut into bite-size pieces and individually packaged for the consumer.

WO 2007/042096 describes a chilled dessert product comprising a moulded gel part and a fat-based anhydrous coating. The product has a temperature of 1-10° C. In the method for preparing the chilled dessert product, it is preferably avoided that the gel part, after the gel structure has been formed, is frozen.

EP 0 818 149 concerns a food composition in the form of a mousse-like plastic mass. The composition is an oil-in-water emulsion comprising fats, milk proteins and water. It is obtained by producing the emulsion, pasteurizing it at a temperature of between 80 and 110° C., pre-cooling it to a temperature of from 30 to 60° C. and aerating the mixture by injection of an inert gas. The food composition thus obtained, after further cooling to about 2-8° C., is ready for use for filling bakery products or as a filling for wafers.

SUMMARY

It has now been found that a new food product having a unique multiple texture structure appealing in taste can be obtained by aerating and shaping a dairy material in the frozen state and depositing the aerated dairy material on or between layers of another food material which is not the aerated dairy material.

The disclosure herein relates to a multiple texture food product and method of making such a food product. The multiple texture food product comprises a core of a dimensionally stable, aerated dairy material and a shell of another food material which is not the aerated dairy material, such as a shell in the form of bottom and top biscuit-type layers or in the form of a non-aerated dairy material enrobing the aerated core. The disclosure herein further relates to the aerated dairy material and processes for the manufacture of the multiple texture food product and the aerated dairy material, respectively.

A first aspect of the disclosure provides a process for the manufacture of an aerated dairy material comprising the steps of:
(1) providing a dairy material
(2) freezing the dairy material by cooling it to a temperature of −2° C. or less,
(3) aerating the frozen dairy material,
(4) shaping the aerated, frozen dairy material,
(4') optionally thawing or allowing to thaw the shaped, aerated, frozen dairy material,
wherein the aerated dairy material has a Stevens firmness of 20 or more at a temperature in the range of from 5 to 10° C. and a water activity (aw) of 0.90 or more.

A second aspect of the disclosure provides a process for the manufacture of a multiple texture food product comprising the following steps:
(1) providing a dairy material
(2) freezing the dairy material by cooling it to a temperature of −2° C. or less,
(3) aerating the frozen dairy material,
(4) shaping the aerated, frozen dairy material,
(5) depositing the shaped, aerated, frozen dairy material on or between one or more layers of a food material which is not the aerated dairy material,
wherein the aerated dairy material has a Stevens firmness of 20 or more at a temperature in the range of from 5 to 10° C. and a water activity (aw) of 0.90 or more.

A third aspect of the disclosure provides an aerated dairy material having a Stevens firmness of 20 or more at a temperature in the range of from 5 to 10° C. and a water activity $(a_w)$ or 0.90 or more.

A fourth aspect of the disclosure provides a multiple texture food product which comprises:
a core of an aerated dairy material having a Stevens firmness of 20 or more at a temperature in the range of from 5 to 10° C. and a water activity of 0.90 or more and
a shell of a non-aerated dairy material.

The aerated dairy material and multiple texture food product of the third and fourth aspects can be produced according to the processes constituting the first and second aspects, respectively.

BRIEF DESCRIPTION OF THE DRAWINGS

The product and process provided herein is further described by non-limiting examples thereof and with reference to the drawings.

In FIGS. 1 and 2, an aerated and shaped dairy material (2) is deposited between layers of a food material (1, 3). In FIG. 1, the food material (1) forms two separate layers enclosing the aerated and shaped dairy material (2), whereas in FIG. 2 the food material (3) forms a continuous layer enrobing the aerated and shaped dairy material (2).

DETAILED DESCRIPTION

Dairy Material

Figure 1:
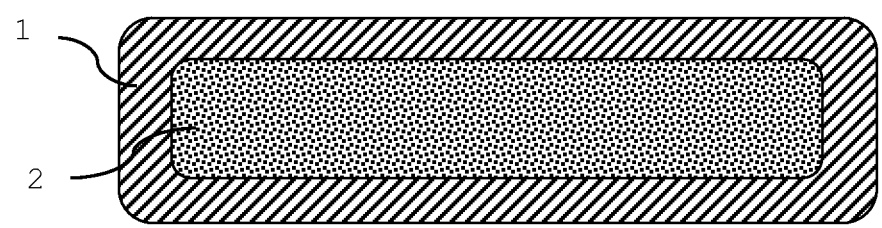
FIG. 1 is a schematic cross-sectional view of a three-layer multiple texture food product as provided.
Figure 2:
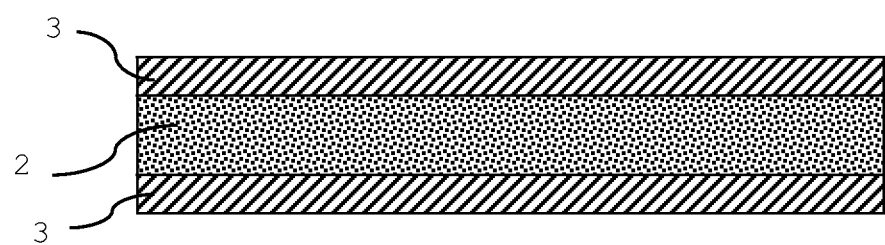
FIG. 2 is a schematic cross-sectional view of another multiple texture food product as provided herein.
Figure 3:
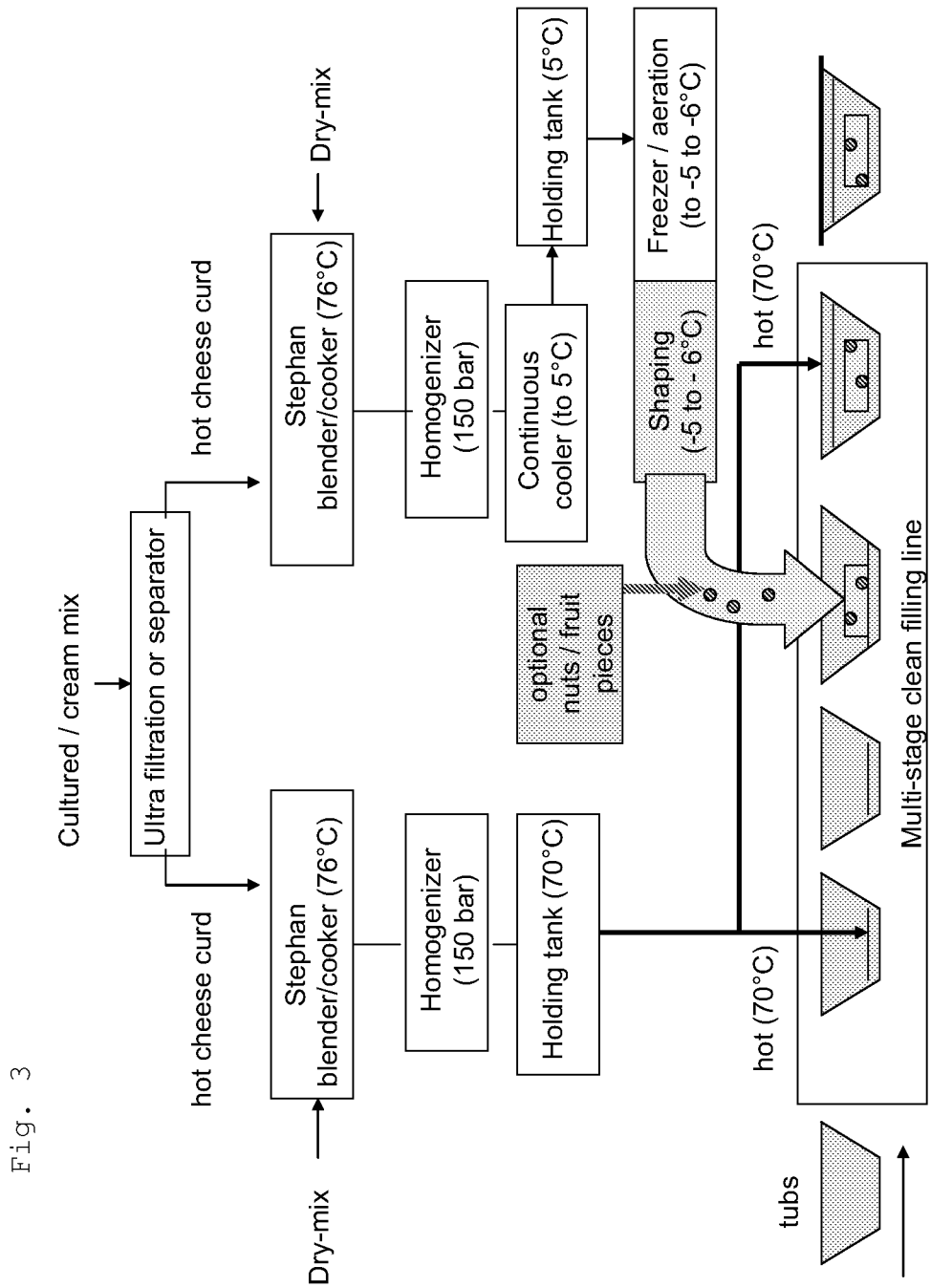
FIG. 3 is a flow chart of an exemplary embodiment of the process as provided herein.

The dairy material may be selected from any dairy material that can be aerated or "whipped", i.e. into which air can be incorporated in the form of small bubbles in a stable manner. In one particular embodiment, the dairy material is a cheese-type dairy material such as cream cheese, processed cheese, curd cheese, matured soft natural cheese, yoghurt or milk. In a preferred embodiment, it is selected from cream cheese and processed cheese. The cream cheese may be derived from any type of sour fermenting cultures and may have any protein content and dry matter content, depending on the concentration process and the desired target fat content, which may be as high as 35% and as low as 1%. The processed cheese may be derived from any type of natural cheeses, optionally flavoured, having any desired fat content.

Apart from dairy components such as milk protein, cream, sour cream, yoghurt, buttermilk powder, skimmed milk powder and whey powder, the dairy material may include added components such as thickening (stabilizing) agents, bulking agents, emulsifying agents, flavouring agents, colouring agents, sweetening agents, acidifying agents and salt. Examples of suitable sweetening agents are sucrose, fructose, maltose, dextrose, glucose, maltose, sorbitol, maltitol, lactitol, glycerol and xylitol. Examples of suitable acidifying agents are acids such as citric acid, lactic acid, malic acid, tartaric acid and ascorbic acid. Added components are preferably capable of being homogeneously distributed in the dairy material, i.e. they can be dissolved or dispersed so as to allow the aeration and shaping of the frozen dairy material.

Preferably, one or more thickening agents are added to and blended in the dairy material so as to render it freeze/thaw stable, i.e. to enable it to maintain its structure over its designated shelf life at refrigerated temperatures, upon freezing, aeration and thawing. Examples of suitable thickening agents are starches, guar gums, xanthan gums, locust bean gums, carob gums, carrageenan gums, pectins and gelatin. The thickening agents may also be used in combination with bulking agents such as dextrins, maltodextrins, inulins, polydextrose, sugars such as sucrose, dextrose and maltose, sugar alcohols and glycerol. Soluble bulking agents with a low texture impact may help to adjust the dry matter content and water activity ($a_w$ value) and may be used as a replacement for sugars in non-sweet applications. Wheat dextrins such as Nutriose® may be particularly useful for this purpose. The types and amounts of added thickening (stabilizing) and bulking agents will depend on the selected dairy material, desired product firmness and mouthfeel whether a sweet or savoury application is intended and can be established by conventional experiments. In particular, the respective types and amounts will be selected such that the required aeration in the frozen state can be carried out. For example, if freezing, aeration and shaping are conducted in a continuous freezer extruder, the composition of the dairy material, specifically in terms of added thickening and bulking agents, has to be adjusted such that its consistency at the temperature of the freezer extruder allows the aeration and extrusion to form a shaped, aerated and frozen dairy material. Ordinarily, the amount of added thickening and bulking agents is in the range of from 0.1 to 20%, preferably 1 to 10%, based on the total weight of the dairy material.

The composition and components of the dairy material are adjusted such that, upon aeration, the aerated dairy material has a Stevens firmness of 20 or more, preferably 30 or more, more preferably 40 or more, when measured at a temperature in the range of from 5 to 10° C. after storage in that temperature range for 48 hours. The Stevens firmness is preferably in the range of from 20 to 80, more preferably from 30 to 50.

Food Material

The food material partly or fully covers the aerated dairy material. In particular, it serves to protect the aerated dairy material, rendering the multiple texture food product cuttable (sliceable) and optionally allowing it to be held with the fingers in a convenient way, e.g. for placing it in one's mouth.

The food material is, therefore, different from the dairy material in its aerated form. In one embodiment, it may be selected from the group consisting of non-aerated cream cheese, non-aerated processed cheese, cereal, bread, biscuit, waffle, sponge cake, chocolate and mixtures of two or more thereof.

In one embodiment, the food material is a pre-formed layer such as a compressed cereal, a biscuit or a waffle. For example, it may be in the form of a sheet structure onto which the aerated dairy material is to be deposited.

In an alternative embodiment, for forming a coating around the aerated dairy material, the food material is capable of changing from an amorphous state to a defined shape upon cooling to a refrigerated temperature. Examples of such food materials are a non-aerated cream cheese, a non-aerated processed cheese or a chocolate. In this embodiment, it is preferred that the food material is selected or adjusted such that it changes into the liquid amorphous phase at a temperature above room temperature, e.g. at 30° C. or more, or at 40° C. or more, or at 50° C. or more. Thus, upon contacting the frozen aerated dairy material and cooling, the food material forms a layer on or around the aerated dairy material. In a preferred embodiment, the food material is selected from non-aerated cream cheese and non-aerated processed cheese. The term "non-aerated" (or "not aerated") is to be understood as referring to a property wherein the material concerned has an overrun of 10% or less, preferably 7% or less, more preferably 5% or less, even more preferably 3% or less, or 1% or less, including 0%. Overrun values of up to 10%, or more commonly up to 5%, may be generated by conventional processing, such as high shear mixing, resulting in the incorporation of air into the material without an intentional aeration step.

In one particular embodiment, the food material is derived from the same source providing the dairy material. In such case, the food material differs from the dairy material in that it is not aerated. In addition, in general, it is significantly firmer in terms of its Stevens firmness than the aerated dairy material, thus rendering it cuttable (sliceable). In one embodiment, the food material has a Stevens firmness of at least 100, or at least 150, when measured at a temperature in the range of from 5 to 10° C. The firmness of the food material does not usually have an upper limit, as long as its sensory properties such as mouthfeel are acceptable. When the food material is a dairy material, it may have a Stevens firmness of up to 700, or up to 600. It is possible to adjust the physical and sensory properties of the food material by adding and blending different types and/or amounts of additives, as described in the section "Dairy material" above, so as to allow enrobing the aerated dairy material with the heat-liquefied food material. The food material may include particulate additives such as herbs and spices, fruits and vegetables (whole or pieces), and may have a colour different from that of the aerated dairy material.

Provision of Dairy Material (1)

In step 1 of the process, a dairy material as described above is provided. This step may include a conventional process for preparing a dairy material such as cream cheese or processed cheese and may include one or more steps such as (ultra) filtration, separation, acidification, basification, blending with additives as described above, homogenization and pasteurization, using conventional equipment as necessary. Alternatively, the dairy material may be provided in the form as received from the supplier.

In one embodiment, it is possible to pre-cool the dairy material, e.g. to facilitate the freezing of the dairy material in step 2. Pre-cooling may be carried out, for example, in a continuous tube, plate or scrape cooler or batch kettle cooler. The pre-cooling may be conducted to a temperature of 20° C. or less, or 15° C. or less, or 10° C. or less, or 5° C. or less.

Freezing Step (2)

In the freezing step 2 of the process, the dairy material is cooled to a temperature of −2° C. or less or −4° C. or less, preferably −5° C. or less or −6° C. or less. The freezing can be carried out in a continuous or batch freezer, preferably in a combined freezer extruder. Examples of suitable freezer extruders are Gram GIF 400, Tetra Hoyer Frigus SF 600 and WCB MF 600 GA.

Aeration Step (3)

In the aeration step 3, air or an inert gas such as nitrogen is introduced into the frozen dairy material in the form of small bubbles. The aeration can be carried out by in-line whipping using blade/scrape mixers in the freezer chamber, as conventionally used in the manufacture of ice cream. The frozen dairy material is preferably aerated to an overrun in the range of from 10 to 150%, more preferably 20 to 100%, even more preferably 30 to 75%.

Shaping Step (4)

The frozen and aerated dairy material is subsequently shaped. The frozen state of the aerated dairy material allows its forming into defined shapes. Shapes may be, e.g., circular, oval, rectangular, star-shaped, flower-shaped, in sheet form or undulating. For example, the frozen and aerated dairy material may be extruded in the form of a continuous strand having a circular, oval, rectangular etc. cross-section. When the strand exits the extruder, it is cut into slices or blocks, e.g. with a knife or wire cutter. The cutting is preferably carried out at a product temperature in the range of from −2 to −6° C.

In a preferred embodiment, the freezing, aerating and shaping of the dairy material is carried out in a continuous freezer extruder with subsequent separator (e.g., a knife or wire cutter), as conventionally used in the manufacture of ice cream. Again, examples of suitable equipment for this purpose are Gram GIF 400, Tetra Hoyer Frigus SF 600 and WCB MF 600 GA. Thus, the dairy material, optionally pre-cooled, is introduced into the continuous freezer extruder where it is cooled to −2° C. or less, aerated and extruded through a nozzle having the desired shape. The extruded frozen and aerated dairy material is cut with a conventional cutting means such as a wire cutter or knife into slices or slabs.

In one embodiment, additional texture components as defined above may be introduced into the shaped dairy material, e.g., by injecting or pushing the texture components into the shaped dairy material. Examples of suitable equipment for this purpose are the Gram Feeder IF 2000 and Tetra Hoyer Addus FF, as conventionally used in the manufacture of multi-component ice cream.

In case it is intended to provide the aerated dairy material as such, instead of further processing it in accordance with the second aspect, the shaped, aerated, frozen material may be thawed or allowed to thaw (step (4')), e.g., by keeping it in a refrigerator at the usual storage temperature, such as 2 to 10° C. This can also be done for the purpose of measuring the Stevens firmness.

Depositing Step (5)

Upon shaping of the frozen and aerated dairy material, it is deposited on or between one or more layers of a food material, as defined above. For example, the shaped dairy material may be deposited on a layer of the food material, optionally placing another layer of food material on or around the deposited dairy material. The layer of food material may be provided in a tub (mould) or on a continuous belt (conveyor belt).

In one embodiment, single tubs are provided on a continuous conveyor belt. They are subsequently pre-filled with a layer of food material, for example a wafer or liquefied layer of food material. Then, the frozen, aerated and shaped dairy material is deposited on the food material layer in the tubs and, finally, another layer of the same or different food material is placed on the dairy material. In particular, in the case of the food material being a non-aerated cream cheese or non-aerated processed cheese, the tubs may be hot-filled with a first layer of the food material in liquefied form. Subsequently, the aerated and shaped dairy material is deposited on the liquefied food material, and another layer of the liquefied food material is poured in the tub, thus enrobing the dairy material. Alternatively, the tubs may be hot-filled with the desired amount of liquefied food material, with the aerated and shaped dairy material being deposited on and subsequently dipped into the food material. Owing to the frozen state of the dairy material, the liquefied food material will solidify fully or in part.

Finally, the resulting multiple texture food product may be cooled or allowed to thaw to the storage temperature, usually in the range of from 2 to 10° C.

Aerated Dairy Material

The aerated dairy material has a Stevens firmness of 20 or more, preferably 30 or more, more preferably 40 or more, when measured at a temperature in the range of from 5 to 10° C. after storage in that temperature range for 48 hours. The Stevens firmness is preferably in the range of from 20 to 80, more preferably from 30 to 50. The firmness of the aerated dairy material, as measured in terms of the Stevens firmness, reflects an important property, namely dimensional stability, maintenance of an aerated texture throughout the desired shelf life and lack of collapsing.

Preferably, the aerated dairy material has an overrun in the range of from 10 to 150%, more preferably 20 to 100%, even more preferably 30 to 75%. In a preferred embodiment, it is selected from aerated cream cheese and aerated processed cheese.

Since the aerated dairy material is derived from the dairy material as defined above, it shares its product properties such as type and amount of constituent components. Furthermore, the aerated dairy material is characterized by a water activity ($a_w$) of 0.90 or more, preferably from 0.95 to 0.99, even more preferably from 0.98 to 0.99. The water activity of the aerated dairy material can be adjusted by selecting the composition of the underlying non-aerated dairy material accordingly.

The water activity of a food product is defined as the ratio between the water vapour pressure (p) of the food product and that of pure water ($p_0$) and is dependent on the temperature. The water activity reflects the amount of "free" water in the food product which is available for the growth of microorganisms such as bacteria, yeasts and moulds. Food products having a water activity above about 0.90 are prone to bacterial spoilage, unless they have a reduced pH and are stored under conditions such as refrigeration which slow down or prevent the growth of microorganisms.

While the water activity of the dairy material is generally measured in its aerated form, i.e. in the form adopted in the final product, it is believed on the basis of principle physical considerations (and it has been experimentally confirmed) that the water activity of one and the same dairy material is essentially unchanged, whether determined on the aerated or on the non-aerated material.

Multiple Texture Food Product

The multiple texture food product may be in the form of a layered structure wherein the aerated and shaped dairy material is deposited on a pre-formed layer of the food material, forming a multiple texture food product having a two-layer structure. Similarly, the aerated and shaped dairy material may be deposited between two pre-formed layers of the food material, thus forming a multiple texture food product having a three-layer structure. It is also possible to form a combination of aerated and shaped dairy material and food material by combining a higher number of layers in an alternating fashion, either terminating with an aerated and shaped dairy material layer or a food material layer.

In an alternative embodiment, the aerated and shaped dairy material is fully or partly enrobed by a layer of the food material, forming a type of core/shell structure.

Yet another embodiment may be contemplated where the multiple texture food product has a structure such that the aerated and shaped dairy material is deposited between a layer of a pre-formed sheet of the food material and another layer of a different food material which assumes a defined shape only upon cooling to a refrigerated temperature, i.e. upon contacting the frozen aerated dairy material.

In a preferred embodiment, the multiple texture food product comprises a core of the aerated dairy material, which is an aerated cream cheese or aerated processed cheese, enrobed by a layer of the food material, which is a non-aerated cream cheese or non-aerated processed cheese. In this embodiment, both the core and the shell may be based on the same or same type of dairy material, i.e. either cream cheese or processed cheese, or they may be based on different or different types of dairy materials, i.e. one being based on cream cheese and one being based on processed cheese.

In a preferred embodiment, the aerated dairy material constituting the core of the multiple texture food product and the shell of a non-aerated dairy material have approximately (i.e. within 2 percentage points) the same water activity, for example 0.98 to 0.99 for a cream cheese-based product and 0.96 to 0.98 for a processed cheese-based product.

In the multiple texture food product, the aerated dairy material may contain one or more texture components added after aeration and shaping, such as pieces of fruits, vegetables, herbs, spices, cereal and confectionery. Examples of suitable fruits include apple, pears, strawberry, raspberry, blueberry, cranberry, currants, blackberry, cherry, peach, nectarine, apricot, banana, kiwi, pineapple, papaya and mango. Examples of suitable vegetables include beets, carrot, celery, aubergine, squash, pumpkin, peppers, lentils and mushrooms. Cereal includes whole or broken grains or flour-based materials which may include up to 50 wt. % of other ingredients such as sugars, acids, thickeners and flavourings. Confectionery includes pieces of chocolate such as chips, shavings or shreds.

In general, the multiple texture food product is a refrigerated product which is preferably kept at a temperature of from 2 to 10° C. during storage. A higher temperature is likely to substantially reduce the shelf life of the product. Preferably, the product is stored at a temperature of from 3 to 8° C. In order to provide an optimal taste and texture, it may be beneficial to cause the product to have a somewhat higher temperature at consumption. Depending on the product design and components, the multiple texture food product may be best consumed at a temperature of, e.g., 12 to 17° C.

EXAMPLES

Measurement of Water Activity

The water activity ($a_w$ value) of a sample of the material is determined at 20° C. using an AquaLab Model XC-2 instrument and following the manufacturer's instructions. The linear offset of the instrument is verified against two known salt standards, one having an $a_w$ value greater than the sample and the other one having an $a_w$ value smaller than the sample. The $a_w$ value of the sample is measured repeatedly until two successive values differ by less than 0.003. The $a_w$ value of the material is the average of those two successive values. The $a_w$ value of distilled water is 1.000±0.003.

Overrun

The "overrun" describes the air content in the aerated material. It is the percent increase in volume of the material upon aeration:

$$\% \text{ overrun} = \frac{V(\text{aerated material}) - V(\text{non-aerated material})}{V(\text{non-aerated material})}$$

In case particulates are added to the aerated material, their volume is not included in the calculation.

Stevens Firmness

For measuring the Stevens firmness, a sample of a food product having a surface of about 20 to 25 cm² (allowing four measurements) and a thickness of 2 to 4 cm is provided in a tub or on a plate. The sample is measured 48 hours after thawing, stored at a temperature of 8 to 10° C. for equilibration. Using a Stevens LFRA Texture Analyzer, a conical) (45° probe is pushed into the sample to a depth of 10 mm at a speed of 2 mm/second, while the penetration force is constantly measured. The Stevens firmness is obtained as the peak penetration force in grams. The reported Stevens firmness of a food product is the average of four measurements, with the relative standard deviation (coefficient of variation) being no more than 10%.

Example 1

Cream Cheese-Based Food Product with Dual Texture

A core/shell-type dual texture cream cheese product is prepared with a creamy aerated core and a sliceable shell.

For both the core and the shell, a cream cheese curd is prepared by state-of-the-art processing, using the separator or ultra-filtration process. The curd has about 30% dry matter, about 20% fat and a pH of 4.7. The curd has a flexible composition because the final product texture can be modified by the addition of thickening agents such as gelatin, gums or starch.

The dairy material from which the aerated core is prepared has the following composition:

| Core - dairy material composition | [%] | [g] |
|---|---|---|
| Cream cheese type curd (30% dry matter) | 92.95 | 23237.50 |
| Gelatin 200 bloom | 0.60 | 150.00 |
| Locust bean gum | 0.20 | 50.00 |
| Wheat dextrin | 4.20 | 1050.00 |
| Salt | 0.65 | 162.50 |
| Potassium sorbate | 0.05 | 12.50 |
| Modified starch | 1.35 | 337.50 |
| Total | 100.00 | 25000.00 |

For providing the dairy material, the cheese curd received from the separator is added to a Stephan cooker/mixer (capacity 40 liters). The additives itemized above are added and mixed at high shear (1,500 rpm). Indirect heating of the mixer content is initiated while continuing gentle scraping and low shear mixing at 300 rpm. The temperature is raised to 76° C. and held for 2 minutes. The resulting hot cheese mix is pumped through a homogenizer run at 150 bar and returned to the Stephan cooker/mixer. Subsequently, the cheese mix is cooled indirectly with ice water, again continuing gentle scraping and low shear mixing at 300 rpm. Finally, the cheese mix is pre-cooled to 10° C. and transferred into the tank of a Gram freezer.

The food material from which the non-aerated shell is prepared is a dairy material having the following composition:

| Shell - food material composition | [%] | [g] |
|---|---|---|
| Cream cheese type curd (30% dry matter) | 98.00 | 24500.00 |
| Gelatin 200 bloom | 1.30 | 325.00 |
| Salt | 0.65 | 162.50 |
| Potassium sorbate | 0.05 | 12.50 |
| Total | 100.00 | 25000.00 |

For providing the food material, the cheese curd received from the separator is added to a Stephan cooker/mixer. The additives itemized above are added and mixed at high shear (1,500 rpm). Indirect heating of the mixer content is initiated while continuing gentle scraping and mixing at 300 rpm. The temperature is raised to 76° C. and held for 2 minutes. The resulting hot cheese mix is pumped through a homogenizer run at 150 bar and kept in a holding tank at 70° C.

Cups (moulds) having an oval shape of 6×10 cm and a capacity of 150 ml are pre-filled with about 60 ml of the liquid food material at 70° C. on an automatic filling line.

Freezing, aerating and shaping of the dairy material is carried out as a combined step in a Gram freezer extruder GIF 400 set to a mix flow of about 65 liters/hour, an overrun of about 50% and a viscosity of maximum 100% and equipped with a nozzle producing an oval extruder strand of 7 cm×4 cm. The pump is started and the pre-cooled cheese mix is fed at 1 to 2 bar gauge pressure into the Gram freezer extruder. Extruded dairy material is discarded or recycled until it reaches a temperature of −5° C. At that time, oval slices of 2.0 cm thickness are cut from the extruded strand at the nozzle exit with an automatic wire cutter and deposited on the pre-filled liquid food material layer in the cups on the automatic filling line. In a second filling step, another 50 ml of hot food material are filled on top of the aerated dairy material so as to enrobe the dairy material in the food material and form a core of aerated dairy material and shell of non-aerated food (dairy) material. The cups are sealed with a lid of aluminium foil and cooled to the storage temperature (refrigerator).

The food material and aerated dairy material used above each had a water activity of 0.99. The Stevens firmness of the aerated dairy material was 30 when measured separately after 48 hours.

In an alternative, extended embodiment of this example, the cups are lined with a paper sheet prior to the pre-filling with liquid food material, wherein the paper sheet is trimmed such that its edges, upon filling of shell and core material, do not extend above the upper edge of the cup, thus allowing closure and sealing of the cup with the aluminium foil lid.

The core/shell-type dual texture cream cheese product is found to be sliceable, owing to the firm shell texture, while offering a unique creamy sensation upon consumption, owing to the aerated texture of the core.

Figure 4:
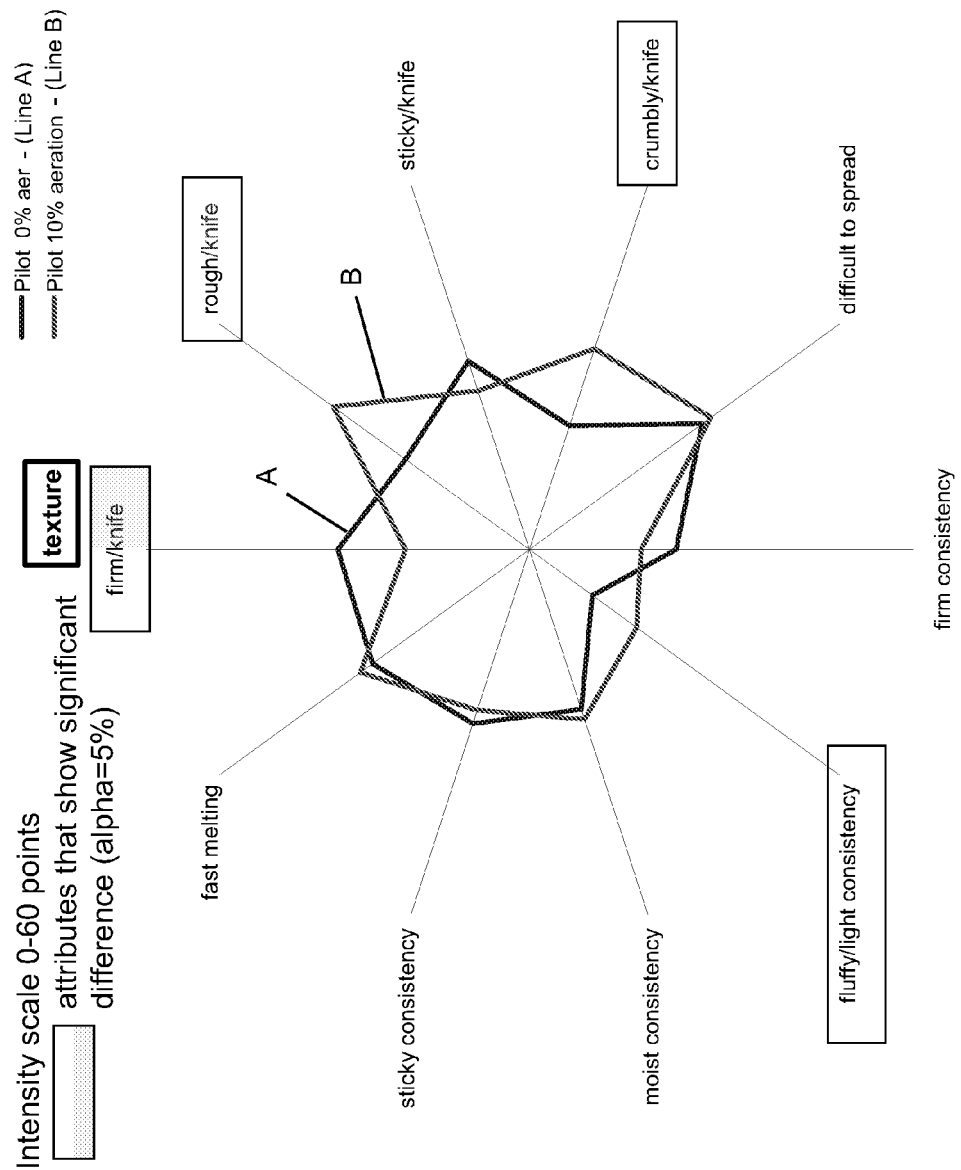
FIG. 4 is a spider diagram comparing a dual texture product similar to Example 1 with the non-aerated cream cheese material.

The results of a sensory test of a core/shell-type dual texture cream cheese product similar to Example 1, yet using an aeration of 10% (line B), compared with the non-aerated cream cheese material (line A), are shown in FIG. 4. FIG. 4 demonstrates that consumers perceive the aerated products as less firm and lighter in taste.

Examples 2a and 2b

Processed Cheese Food Product with Dual Texture

A core/shell-type dual texture processed cheese product is prepared with a creamy aerated core and a sliceable shell, either in a tub or as an on-the-go snack bar.

For both the core and the shell, a processed cheese is prepared from cheddar cheese and gouda cheese, but any natural cheese could be used, depending on the desired texture and taste requirements for the finished product.

The dairy material from which the aerated core is prepared has the following composition:

| Core - dairy material composition | [%] | [g] |
|---|---|---|
| Water | 44.37 | 11092.50 |
| Cheddar cheese (mid age) * | 14.00 | 3500.00 |
| Gouda cheese (young) | 10.00 | 2500.00 |
| Butter | 9.00 | 2250.00 |
| Sodium casein | 3.00 | 750.00 |
| Skim milk powder | 8.00 | 2000.00 |
| Modified starch | 2.00 | 500.00 |
| Wheat dextrin | 5.00 | 1250.00 |
| Gelatin 200 bloom | 1.50 | 375.00 |
| Locust bean gum | 0.35 | 87.50 |
| Melting salt (E 450 abc) | 0.80 | 200.00 |
| Melting salt (E 339) | 0.40 | 100.00 |
| Potassium sorbate | 0.10 | 25.00 |
| Salt | 1.00 | 250.00 |
| Titanium dioxide | 0.10 | 25.00 |

-continued

| Core - dairy material composition | [%] | [g] |
|---|---|---|
| Cheddar cheese flavor | 0.35 | 87.50 |
| Colour - β carotene 1% | 0.03 | 7.50 |
| Total | 100.00 | 25000.00 |

For providing the dairy material, the ground cheese shreds are added to a Stephan cooker/mixer (capacity 40 liters). Butter is added and mixed and cut at high shear (1,000 rpm) for 30 seconds. All remaining ingredients (powders) except water are added and mixed for 1 minute. Water is added slowly on top and mixed for 2 minutes. Indirect heating of the mixer content is initiated while continuing gentle scraping and mixing at 300 rpm. The temperature is raised to 85° C. and held for 2 minutes. The resulting hot cheese mix is pumped through a homogenizer run at 150 bar and returned to the Stephan cooker/mixer. Subsequently, the cheese mix is cooled indirectly with ice water, again continuing gentle scraping and mixing at 300 rpm. Finally, the cheese mix is pre-cooled to 10° C. and transferred into the tank of a Gram freezer.

The food material from which the non-aerated shell is prepared is a dairy material having the following composition:

| Shell - food material composition | [%] | [g] |
|---|---|---|
| Water | 32.05 | 3205.00 |
| Cheddar cheese (mid age) | 16.00 | 1600.00 |
| Gouda cheese (young, mild) | 40.00 | 4000.00 |
| Butter | 6.00 | 600.00 |
| Salt | 0.90 | 90.00 |
| Skim milk powder | 2.00 | 200.00 |
| Melting salt (E 450 c) | 2.00 | 200.00 |
| Melting salt (E 339) | 1.00 | 100.00 |
| Potassium sorbate | 0.05 | 5.00 |
| Total | 100.00 | 10000.00 |

For providing the food material, the ground cheese shreds are added to a Stephan cooker/mixer. Butter is added and mixed at high shear (1,000 rpm) for 60 seconds. All remaining ingredients (powders) except water are added and mixed for 1 minute. Water is slowly added on top and mixed for 2 minutes. Indirect heating of the mixer content is initiated while continuing gentle scraping and mixing (300 rpm). The temperature is raised to 85° C. and held for 2 minutes. The resulting hot cheese mix is cooled to 70° C. so as to stay liquid and pourable and is kept at this temperature.

Example 2a

Tubs

Round tubs (moulds) having a diameter of 9 cm and a capacity of 200 ml are pre-filled with 120 ml of the liquid food material at 70° C. on an automatic filling line.

Freezing, aerating and shaping of the dairy material is carried out as a combined step in a Gram freezer extruder GIF 400 set to a mix flow of about 65 liters/hour, an overrun of about 50% and a viscosity of maximum 100% and equipped with a nozzle producing a circular extruder strand having a diameter of 6 cm. The pump is started and the pre-cooled cheese mix is fed at 1 to 2 bar gauge pressure into the Gram freezer extruder. Extruded dairy material is discarded or recycled until it reaches a temperature of −5° C. At that time, circular slices of 2.0 cm thickness are cut from the extruded strand at the nozzle exit with an automatic wire cutter and deposited on the pre-filled liquid food material layer in the round tubs on the automatic filling line. The aerated dairy material is pushed down gently into the liquid food material with a tool so as to enrobe the dairy material in the food material and form a core of aerated dairy material and shell of non-aerated food (dairy) material. The round tubs are sealed with a lid of aluminium foil and cooled to the storage temperature (refrigerator).

The water activity of the processed cheese was 0.97 and the Stevens firmness of aerated dairy material was 40.

Example 2b

On-the-go Snack Bar

Mini bread-shaped trays or moulds having a dimension of 10 cm×3 cm×3 cm are with a concave bottom are pre-filled to ⅓ of their volume with the liquid food material at 70° C. on an automatic filling line.

Freezing and aerating of the dairy material is carried out as in Example 2a, yet with a circular nozzle having a diameter of 1.5 cm. In the shaping step, sticks having a length of 8 cm (amounting to about ⅓ of the tray volume) are cut from the extruded strand at the nozzle exit with a guillotine knife and transferred into a freezing tunnel, cooling them to −18° C. The frozen sticks are deposited on the pre-filled food material in the trays on the automatic filling line. Subsequently, liquid food material is filled on top of the deposited frozen stick in each of the trays so as to fully enrobe them. The trays are sealed with a lid of aluminium foil and cooled to the storage temperature (refrigerator).

The water activity of the dairy material was 0.97. The Stevens firmness of the aerated dairy material could not be measured directly on the product, owing to the reduced thickness of the sticks. Yet, it was estimated to be as in Example 2a.

In a further variation of this example, the snack bar is produced in a mould, removed from the mould and packaged with a flow-wrap packaging with modified atmosphere (MAP).

The core/shell-type dual texture processed cheese product is found to be sliceable, or capable of being eaten as an on-the-go snack bar, owing to the firm shell texture, while offering a unique creamy sensation upon consumption, owing to the aerated texture of the core.

Example 3

On-the-go Bread & Cheese Snack Bar

A slice of pasteurized moist bread, e.g., rye bread ($a_w$=0.96), having a size of 8 cm×5 cm×0.5 cm is placed into a plastic packaging tray having a size of 10×6×4 cm.

The dairy material of Example 1 is used, yet having a water activity $a_w$ reduced to 0.97 by addition of about 3 wt. % of glycerol. Freezing and aerating of the dairy material is carried out as in Example 1. In the shaping step, the nozzle at the exit of the freezer has an opening of 7.5 cm×4.5 cm. Slices having a thickness of 1.5 cm are automatically cut with a cutting wire. A frozen slice of aerated dairy material is deposited on the bread slice in the tray. Subsequently, the automatic filling line deposits another slice of pasteurized moist bread on top of the frozen slice of aerated dairy material, creating a sandwiched snack. The packaging trays are flushed with inert gas to create a modified atmosphere and sealed with an aluminium foil lid. The resulting product is a lasting bread & cheese sandwich snack stored and consumed at refrigerated temperature.

While the invention has been particularly described with specific reference to specific embodiments, it will be appreciated that various alterations, modifications, and adaptations may be based on the present disclosure, and are intended to be within the spirit and scope of the invention as defined by the following claims.

What is claimed is:

1. A process for the manufacture of multiple texture product comprising:
    providing a dairy material,
    freezing the dairy material by cooling it to a temperature of −2° C. or less,
    aerating the frozen dairy material,
    shaping the aerated, frozen dairy material to form a solid slice, slab, or block of the aerated, frozen dairy material, and cutting said solid slice, slab, or block;
    providing at least one tub having an interior;
    depositing at least one layer of a dairy food material distinct from the dairy material into the interior of the at least one tub, wherein said distinct dairy food material is selected from the group consisting of cream cheese, processed cheese, curd and combinations thereof; and
    depositing and pushing down the solid slice, slab, or block of the shaped, aerated, frozen dairy material into the at least one layer of the dairy food material in the interior of the at least one tub to fully enrobe the solid slice, slab, or block of the shaped, aerated, frozen dairy material by the at least one layer of the dairy food material in the interior of the tub; and
    cooling the tub containing the fully enrobed aerated dairy material to form the multiple texture product,
    wherein the fully enrobed solid slice, slab, or block of the shaped, aerated dairy material has a Stevens firmness of 20 or more at a temperature in the range of from 5 to 10° C. and a water activity ($a_w$) of 0.90 or more.

2. The process of claim 1, wherein the aerated, frozen dairy material is selected from the group consisting of cream cheese, processed cheese, curd and combinations thereof.

3. The process of claim 1, wherein the frozen dairy material is aerated to an overrun in the range of from 10 to 150%.

4. The process of claim 1, wherein the freezing, aerating and shaping of the frozen dairy material is carried out in a continuous freezer extruder.

5. The process of claim 1, the process further comprising thawing or allowing the solid slice, slab, or block of the shaped, aerated, frozen dairy material to thaw.

6. The process of claim 1, wherein the depositing of the solid slice, slab, or block of the shaped, aerated, frozen dairy material into the at least one layer of the distinct dairy food material includes depositing the solid slice, slab, or block of the shaped, aerated, frozen dairy material into the distinct dairy food material in the interior of the at least one tub when the at least one layer of the distinct dairy food material is liquefied and at a temperature of at least about 70° C.

7. The process of claim 6, wherein the depositing of the solid slice, slab, or block of the shaped, aerated, frozen dairy material step comprises bringing at least a portion of the solid slice, slab, or block of the shaped, aerated, frozen dairy material into contact with the liquefied at least one layer of the distinct dairy food material to solidify at least a portion of the liquefied distinct dairy food material contacting the at least a portion of the solid slice, slab, or block of the shaped, aerated frozen dairy material and to thaw the at least a portion of the solid slice, slab, or block of the shaped, aerated, frozen dairy material coming into contact with the at least a portion of the liquefied distinct dairy food material.

8. The process of claim 7, further comprising blending at least one thickening agent, at least one bulking agent, or combinations thereof into the dairy material prior to the freezing of the dairy material.

9. The process of claim 1, wherein the providing the at least one tub having an interior further comprises lining said interior with at least one layer of paper prior to the depositing of the at least one layer of the distinct dairy food material into the interior.

10. The process of claim 1, wherein the fully enrobed solid slice, slab, or block of the aerated dairy material has a Stevens firmness of from 20 to 80 at a temperature in the range of from 5 to 10° C., and wherein the distinct dairy food material is nonaerated and has a Stevens firmness of 100 to 150 at a temperature in the range of from 5 to 10° C.

11. The process of claim 1, wherein the solid slice, slab, or block of the aerated, frozen dairy material formed by the shaping step substantially retains its shape after the depositing of the solid slice, slab, or block of the shaped, aerated, frozen dairy material into the at least one layer of the distinct dairy food material in the interior of the at least one tub to fully enrobe the solid slice, slab, or block of the shaped, aerated, frozen dairy material by the at least one layer of the distinct dairy food material in the interior of the tub.

\* \* \* \* \*